United States Patent
Gallagher

(10) Patent No.: US 10,705,584 B2
(45) Date of Patent: Jul. 7, 2020

(54) POWER SOCKET MANAGEMENT SYSTEM

(71) Applicant: INTERNATIONAL BUSINESS MACHINES CORPORATION, Armonk, NY (US)

(72) Inventor: Aiden Gallagher, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/646,126

(22) Filed: Jul. 11, 2017

(65) Prior Publication Data

US 2019/0018464 A1 Jan. 17, 2019

(51) Int. Cl.
| | | |
|---|---|---|
| G06F 1/26 | (2006.01) | |
| G06F 1/32 | (2019.01) | |
| G06F 1/16 | (2006.01) | |
| H02J 3/14 | (2006.01) | |
| H04L 12/10 | (2006.01) | |
| H04L 12/26 | (2006.01) | |
| G06F 1/3212 | (2019.01) | |
| G06F 1/3209 | (2019.01) | |
| G06F 1/3203 | (2019.01) | |

(52) U.S. Cl.
CPC ............ *G06F 1/266* (2013.01); *G06F 1/1683* (2013.01); *G06F 1/3203* (2013.01); *G06F 1/3209* (2013.01); *G06F 1/3212* (2013.01); *H02J 3/14* (2013.01); *H04L 12/10* (2013.01); *H04L 43/08* (2013.01); *G06F 2200/261* (2013.01); *H02J 2310/14* (2020.01)

(58) Field of Classification Search
None
See application file for complete search history.

(56) References Cited

U.S. PATENT DOCUMENTS

| | | | |
|---|---|---|---|
| 9,417,677 B2 | 8/2016 | Gray | |
| 9,692,259 B2 * | 6/2017 | Boss | ................... H02J 13/0062 |
| 9,815,382 B2 * | 11/2017 | Penilla | ................ B60L 11/1848 |
| 9,929,917 B2 * | 3/2018 | Jones-McFadden | .... H04L 41/22 |
| 10,257,291 B1 * | 4/2019 | Matiash | ................... H04L 67/18 |
| 2005/0273372 A1 * | 12/2005 | Bowne | ................... G06Q 10/02 |
| | | | 705/5 |

(Continued)

FOREIGN PATENT DOCUMENTS

EP 2610701 A9 4/2014

OTHER PUBLICATIONS

Casanova et al., "A Loosely Coupled Planar Wireless Power System for Multiple Receivers", IEEE Transactions on Industrial Electronics, vol. 56, No. 8, Aug. 2009, pp. 3060-3068.

(Continued)

*Primary Examiner* — Jaweed A Abbaszadeh
*Assistant Examiner* — Cheri L Harrington
(74) *Attorney, Agent, or Firm* — Ewa M. Wozniak

(57) ABSTRACT

Method and system are provided for power socket management. The method carried out at a server may include receiving power data from a plurality of user devices and obtaining event information for an event location, including details of the user devices required for the event. The method may process the power data for the required user devices for an event by optimizing the use of power sockets at the event location. The method may notify the required user devices of the optimized socket usage for a user device.

20 Claims, 8 Drawing Sheets

(56) References Cited

U.S. PATENT DOCUMENTS

| | | | | |
|---|---|---|---|---|
| 2007/0294347 | A1* | 12/2007 | Shinnishi | H04W 4/029 709/204 |
| 2009/0192927 | A1* | 7/2009 | Berg | G06Q 30/04 705/34 |
| 2010/0063756 | A1* | 3/2010 | Agrawal | G01R 31/3693 702/63 |
| 2010/0145542 | A1* | 6/2010 | Chapel | H02J 13/0082 323/234 |
| 2010/0149307 | A1* | 6/2010 | Iyer | H04L 12/1827 348/14.09 |
| 2011/0320828 | A1* | 12/2011 | Boss | G06F 1/3209 713/300 |
| 2012/0086546 | A1* | 4/2012 | Montgomery | H02J 3/14 340/5.1 |
| 2012/0089263 | A1* | 4/2012 | Park | H02J 13/001 700/291 |
| 2012/0254634 | A1* | 10/2012 | Chakra | G06F 1/28 713/300 |
| 2013/0162430 | A1 | 6/2013 | Scherzer et al. | |
| 2013/0169219 | A1* | 7/2013 | Gray | G06F 1/28 320/108 |
| 2013/0262197 | A1* | 10/2013 | Kaulgud | G05B 13/02 705/14.1 |
| 2013/0262366 | A1* | 10/2013 | Hjelm | G06N 5/04 706/50 |
| 2014/0090034 | A1* | 3/2014 | Fyke | H04L 63/061 726/5 |
| 2014/0340051 | A1* | 11/2014 | Hargrave | H02J 7/0077 320/162 |
| 2015/0058373 | A1* | 2/2015 | Ahn | G06F 16/3322 707/767 |
| 2015/0123595 | A1* | 5/2015 | Hussain | H02J 7/0052 320/107 |
| 2015/0223025 | A1* | 8/2015 | Avital | H04W 4/023 455/456.3 |
| 2015/0323974 | A1 | 11/2015 | Shuster et al. | |
| 2016/0021546 | A1* | 1/2016 | Cuervo | H04W 48/18 370/254 |
| 2016/0149717 | A1* | 5/2016 | Wada | H04L 12/4625 455/414.1 |
| 2016/0275400 | A1* | 9/2016 | Hodges | G06N 5/04 |
| 2016/0297316 | A1* | 10/2016 | Penilla | B60L 11/1848 |
| 2016/0344138 | A1* | 11/2016 | Kazmier | G01R 21/133 |
| 2017/0019266 | A1* | 1/2017 | Lim | H04L 12/6418 |
| 2017/0126688 | A1* | 5/2017 | Jones-McFadden | H04L 63/102 |
| 2017/0150304 | A1* | 5/2017 | Baldasare | H04W 4/02 |
| 2017/0192483 | A1* | 7/2017 | Boss | G06F 1/329 |
| 2017/0272316 | A1* | 9/2017 | Johnson | H04L 61/301 |
| 2017/0279949 | A1* | 9/2017 | Takahashi | H04W 76/14 |
| 2017/0288456 | A1* | 10/2017 | Chan | H02J 13/0075 |
| 2017/0346303 | A1* | 11/2017 | Vanblon | G06F 1/266 |
| 2018/0032997 | A1* | 2/2018 | Gordon | G06Q 20/3224 |
| 2018/0041071 | A1* | 2/2018 | Chapel | H02J 13/0082 |
| 2018/0212791 | A1* | 7/2018 | Garg | H04L 12/282 |

OTHER PUBLICATIONS

Strommer et al., "NFC-enabled Wireless Charging", 2012 4th International Workshop on Near Field Communication, pp. 36-41.

Zhong et al., "A Novel Single-Layer Winding Array and Receiver Coil Structure for Contactless Battery Charging Systems With Free-Positioning and Localized Charging Features", IEEE Transactions on Industrial Electronics, vol. 58, No. 9, Sep. 2011, pp. 4136-4144.

Mell et al., "The NIST Definition of Cloud Computing", Recommendations of the National Institute of Standards and Technology, Special Publication 800-145, Sep. 2011, 7 pages.

IBM: List of IBM Patents or Patent Applications Treated As Related (Appendix P), Apr. 9, 2018, pp. 1-2.

Pending U.S. Appl. No. 15/906,221, filed Feb. 27, 2018, entitled "Power Socket Management System", pp. 1-40.

* cited by examiner

POWER SOCKET MANAGEMENT SYSTEM

BACKGROUND

The present invention relates to a power socket management system, and more specifically, a system for optimizing user device charging at a location.

It is often difficult to achieve the best use of power supply sockets in any given location. An example is given of a meeting room with an unused projector and conference phones connected to some central sockets. A meeting is scheduled and several people may arrive early and plug their laptops into the first sockets they see. The meeting room may fill up and there may be lots of people sitting around the tables about to start the meeting. An alert on a user's device may then indicate that there is only limited battery life left on their device. The user does not wish to interrupt the speaker or disrupt the meeting but needs to find an available power socket.

The user may scan the room and see all the sockets are occupied but does not know which are actually being used. The conference phones or projector may not be needed during the meeting. Also, some people may have their devices on charge despite having a full battery. It would be considered rude to unplug some else's device and difficult to ask permission during the meeting.

A current solution to this problem is to use extension leads that allow more devices to be plugged in. These are only meant to be for temporary use and are not replacements for permanent wiring. Such extension leads can be unsafe as they add extra trip hazards, overheating and can reduce in efficiency over time.

Conference rooms may have a multi-device charging hub which is similar to an extension lead but also contains areas for phones to be charged and network access. This still has the issue that, once a person has sat down in a position, they are there for the duration of the meeting blocking access to that hub.

Another solution that exists is inductive or wireless charging that uses an electromagnetic field to transfer energy between two devices. This may be provided in a meeting room where all participants can be charging from their position in the room. The issue with this is that it is very expensive and takes a long time to charge especially when busy employees are running lots of energy intensive programs.

BRIEF SUMMARY

Additional aspects and/or advantages will be set forth in part in the description which follows and, in part, will be apparent from the description, or may be learned by practice of the invention.

According to an aspect of the present invention there is provided a computer-implemented method for power socket management carried out at a server, comprising: receiving power data from a plurality of user devices; obtaining event information for an event location, including details of the user devices required for the event; processing the power data for the required user devices for an event by optimizing the use of power sockets at the event location; and notifying the required user devices of the optimized socket usage for a user device for an event.

According to an aspect of the present invention there is provided a system for power socket management, comprising: a processor and a memory configured to provide computer program instructions to the processor to execute the function of the components; a user device monitoring component for receiving power data from a plurality of user devices; an event scheduling component for obtaining event information for an event location, including details of the user devices required for the event; an event processing component for processing the power data for the required user devices for an event by optimizing the use of power sockets at the event location; and a notification component for notifying the required user devices of the optimized socket usage for a user device.

According to an aspect of the present invention there is provided a computer program product for power socket management, the computer program product comprising a computer readable storage medium having program instructions embodied therewith, the program instructions executable by a processor to cause the processor to: receive power data from a plurality of user devices; obtain event information for an event location, including details of the user devices required for the event; process the power data for the required user devices for an event by optimizing the use of power sockets at the event location; and notify the required user devices of the optimized socket usage for a user device.

BRIEF DESCRIPTION OF THE DRAWINGS

The above and other aspects, features, and advantages of certain exemplary embodiments of the present invention will be more apparent from the following description taken in conjunction with the accompanying drawings, in which.

Figure 1:
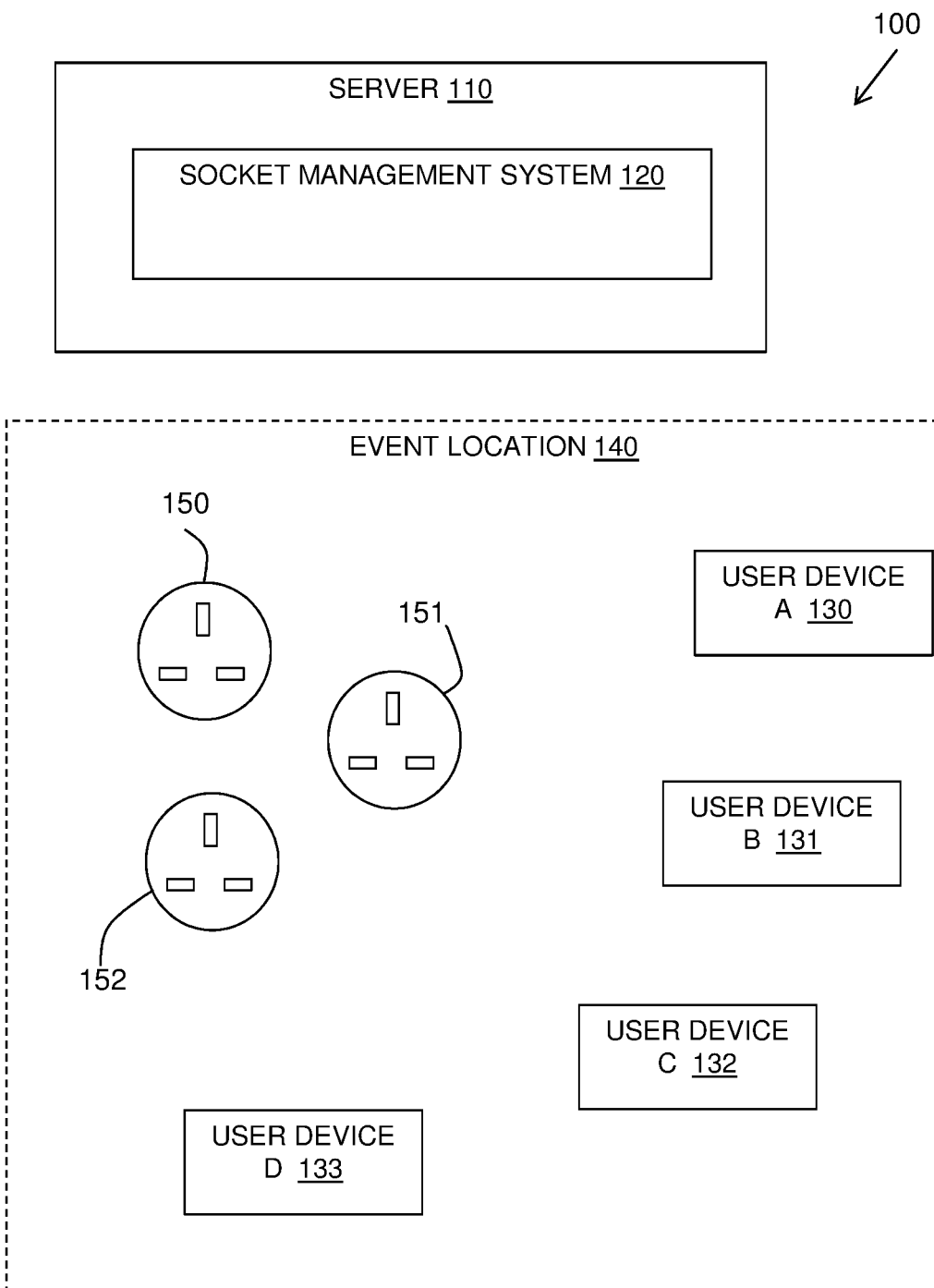
FIG. 1 is a schematic diagram illustrating an example embodiment of a system in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Reference will now be made in detail to the embodiments of the present invention, examples of which are illustrated in the accompanying drawings, wherein like reference numerals refer to like elements throughout. Embodiments of the invention are generally directed to a system.

A system for power socket management for multiple user devices is described with an associated method. The power socket management system may identify socket availability, hardware usage, and user necessity of power supply before making recommendations to users as to where to plug in and when to unplug.

The system monitors sockets provisioned to it and links to user devices that are registered to the system allowing monitoring of the location, battery life and usage of the user devices. Using this information, the system may suggest the optimal usage of sockets by registered user devices for a given situation including: the best times to plug or unplug devices, which sockets the devices would be best to plug into, and recommend when users should swap one device for another due to critical or moderate battery life warnings. The recommendations may be provided to the user devices, for example, via alerts or as a map of a location.

Referring to FIG. 1, a schematic diagram shows an example embodiment of the described system 100.

A socket management system 120 may be provided on a server 110 to which multiple user devices 130-133 may be registered. The server 110 may have one or more designated administrators and may be accessed via a computing device of a user. In one embodiment, the socket management system 120 may be provided on an administrator's computer system for monitoring an office environment.

User devices 130-133 may be any form of computing device such as a laptop, smart phone, tablet, etc. which has a battery that requires charging. The user devices 130-133 may each have a socket management client system, for example, in the form of an application that communicates with the socket management system 120 of the server 110, for example, using a wireless or network connection. A user may have a plurality of registered user devices 130-133.

The socket management system 120 may have one or more registered event locations 140 at which use of sockets 150-152 may be managed. Event locations 140 may be conference rooms, shared offices, hot-desking offices, etc. Events may be defined as scheduled meetings or time periods in which an event location 140 is used.

The socket management system 120 may monitor sockets 150-152 at event locations 140 to determine if they are in active use, if they have a device plugged in which is not in use, or if they are empty. Sockets 150-152 may be smart sockets, which enable the transfer of data to the socket management system 120 regarding their availability.

Smart sockets are remotely controlled sockets that can be used to adjust power settings to turn a power source on or off. These may be a socket that is installed as a replacement to existing standard sockets, or may be in the form of an adapter plug that plugs into an existing socket.

Smart sockets may also be used to obtain data regarding a user device plugged into the socket 150-152. For example, this may be a way of obtaining power data and scheduling data from a registered user device, as well or instead of using a wireless or network connection.

Sockets may be designed so that only those who are using the system and have the socket management application open on their user device are able to access the power using the smart sockets.

In order to ensure everyone that is charging where the system is installed is using the system. A method of ensuring participation may be to block access to a socket unless the user had the application open on their device. Logic on the smart socket's software may be provided that may authenticate the device with the application on the device. For example, the user may swap secure keys to approve power being released from the socket for that device.

The socket management system 120 may process the power data from the user devices 130-133 as well as scheduling data and determine an optimized usage of sockets 150-152 by user devices 130-133 for an event at an event location 140. Notifications may be sent to the user devices 130-133 notifying the user of the sockets 150-152 to use.

Figure 2:
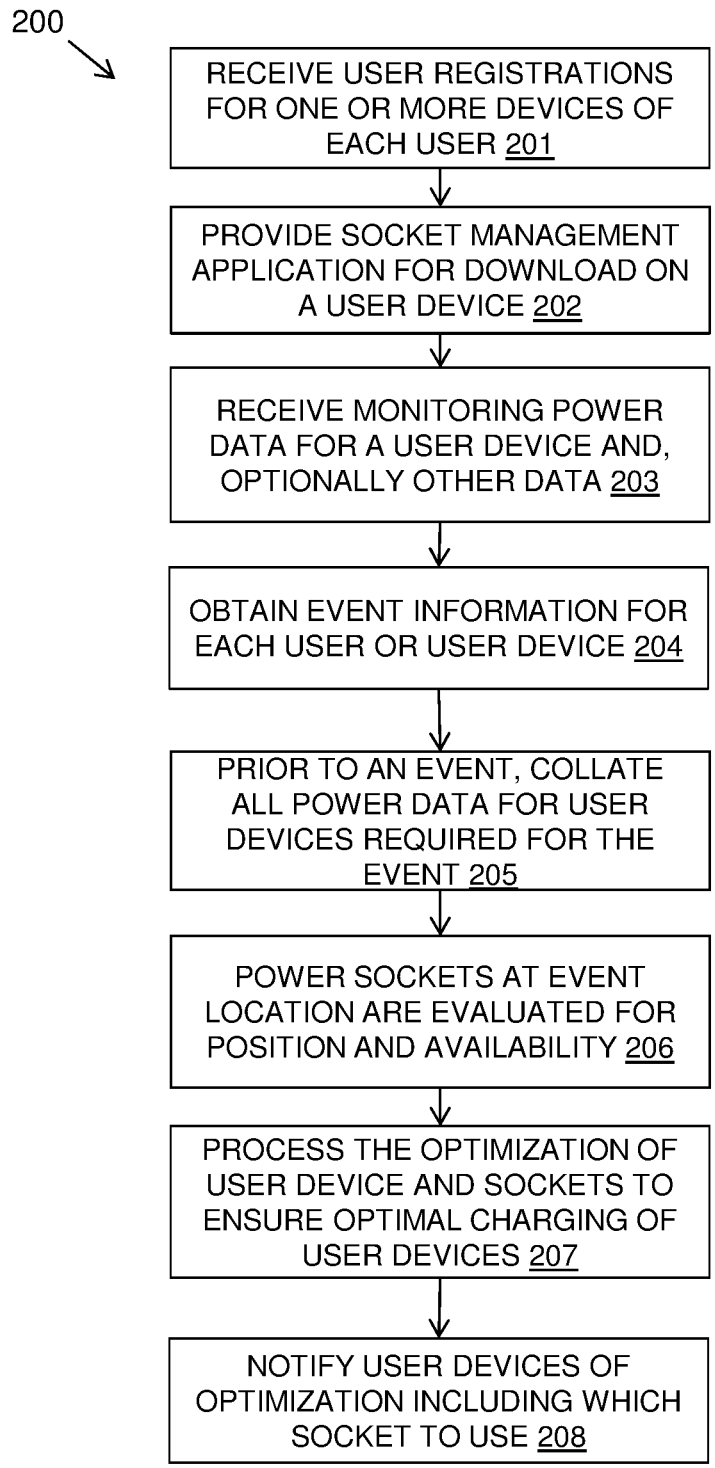
FIG. 2 is a flow diagram of an example embodiment of a method in accordance with the present invention.

Referring to FIG. 2, a flow diagram 200 shows an example embodiment of an aspect of the described method as carried out at a server 110.

The method may receive 201 user registrations. A number of users may be registered to use the socket management system 120 and each user may have a number of devices that are associated with the user (for example, a business laptop, a personal laptop, a business mobile, a personal mobile, etc.).

The user devices 130-133 may be provided 202 with a client application of the socket management system 120, for example, as a downloaded application or accessible via a web browser.

The server 110 may receive 203 monitoring power data for a registered device. The power data may include current battery utilization, required utilization, expected power drain based on current usage and/or history, etc. The power data may be monitored continuously when the user device 130-133 is connected to the power management system, or intermittently at regular or irregular intervals.

The server 110 may obtain 204 event information for each user or each user device 130-133. The event information may be obtained by receiving scheduling data from the user devices 130-133 by accessing their calendar applications or inputs by the user. Alternatively, event information may be entered by a system administrator. Event information may be obtained from one user device 130-133 of a registered user and applied to the other user devices of the registered user. Event information may include required attendees and the user devices 130-133 they may require, presenters, required equipment, and duration as well as the event location. The term event is used broadly to include a time period at a given location, such as registered users coming and going from an office location, as well as more structured conference meetings.

Prior to an event, the method may collate 205 power data for all user devices 130-133 required for the event. Power sockets 150-152 at the event location 140 may be evaluated 206 for position and availability. This may include checking if apparatus such as printers, projectors, telephones, located in the event location are required for the duration of the event.

The method may process 207 the optimization of socket usage for an event at an event location 140 for the user devices 130-133 based on their power data to ensure optimal charging of the user devices 130-133. The prioritization and an algorithm used for the optimization may vary; however, the aim is to ensure all participants in an event do not have user devices 130-133 that run out of battery power during the event.

The processing may keeping track of all necessary devices and their power needs in order to: automatically recommend that a subset of users can charge their device during the event, ensure users have adequate charge beforehand, or recommend meeting/seating changes if too many devices become registered for an event.

A score may be assigned to a user device 130-133 charge necessity (for example, based on current charge, time in event location, and importance of device) which may be used in the optimization, with a higher weighting for urgent charge requirements, devices requiring permanent power, important devices, etc.

The method may notify 208 users via their user devices 130-133 of the optimized socket 150-152 usage for a user device 130-133 for an event.

If the number of user devices that need charging is less than the number of sockets 150-152 in the event location 140, seat locations may be recommended so users may access sockets 150-152.

If the number of user devices 130-133 that need charging is greater than the number of sockets in the event location 140, then alerts may be sent out. If increasing battery life can reduce charge necessity, it may be recommended to users with available calendar slots that they use this time to charge their device. If not, seating may be assigned with sockets 150-152 to higher score devices to begin the meeting. Users who may need to charge their device later in the meeting may be assigned proximity to charge points and may be assigned sockets later in the meeting.

If all necessary devices that need charging cannot be assigned a socket 150-152, this may be flagged to the meeting owner who may review the devices causing the problem and the system may recommend a new event location be assigned or certain devices not be used.

Socket 150-152 location for a user may be provided as a map of the event location viewable on a user device with an indicated socket 150-152. The map may also be accessed for a user to input a request for a socket a suggestion. The socket management system 120 may monitor the location of registered user devices 130-133 and thereby indicate the relative position of the user and the socket 150-152 on the map.

Alternatively, with the application on in the background, when a user enters a new area they will be working in an alert may appear with a color. This color also appears above the socket 150-152 they should be using. If this cannot be found, the map will also show the information to the user.

Sockets 150-152 may be designed so that only those who are using the system and have the socket management system 120 open are able to access the power using smart sockets 150-152. This means all users will comply with the alerts and knowledge of the utilization system.

Figure 3:
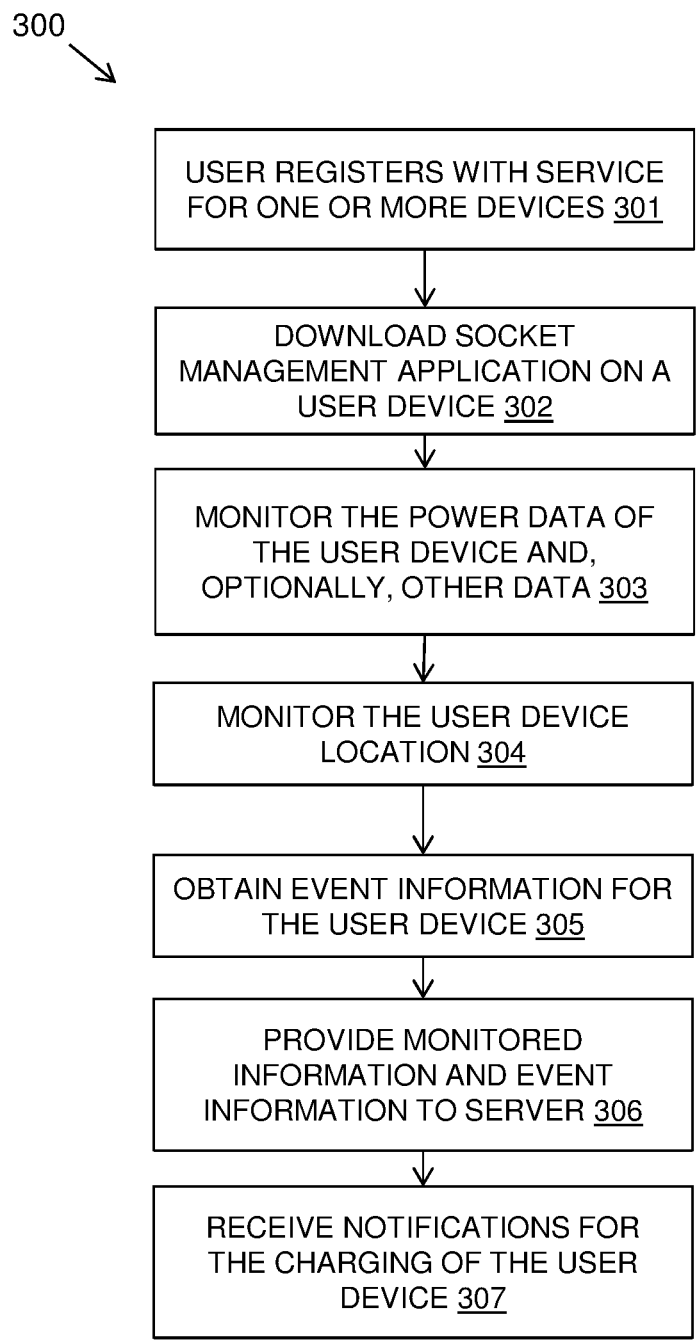
FIG. 3 is a flow diagram of an example embodiment of a method in accordance with the present invention.

Referring to FIG. 3, a flow diagram 300 shows an example embodiment of an aspect of the described method carried out at a user device.

A user may register 301 with the socket management system 120 at the server 110 from a user device 130-133. The user may register several user devices in the registration. The user may download the client application of the socket management system 120 or access it via a web browser on each of their devices 302.

The application may monitor 303 power data of the user device 130-133. The power data may include current battery utilization, required utilization, expected power drain based on current usage and/or history, etc. The power data may be monitored continuously when the user device is connected to the power management system at the server, or intermittently at regular or irregular intervals. The application may also monitor 304 the user device location 304.

The application may obtain 305 event information for the user device 130-133 by accessing a calendar application on the user device or by receiving event inputs in the application.

The monitored information may be provided 306 to the socket management system 120 of the server for processing either via a wireless or network connection, or when a device is plugged into a smart socket 150-152 in communication with the server. The user device may receive 307 notifications relating to charging the user device prior to or during an event. The user device 130-133 may display the notifications, which may be in the form of alerts or a map showing charging locations to be used.

Figure 4:
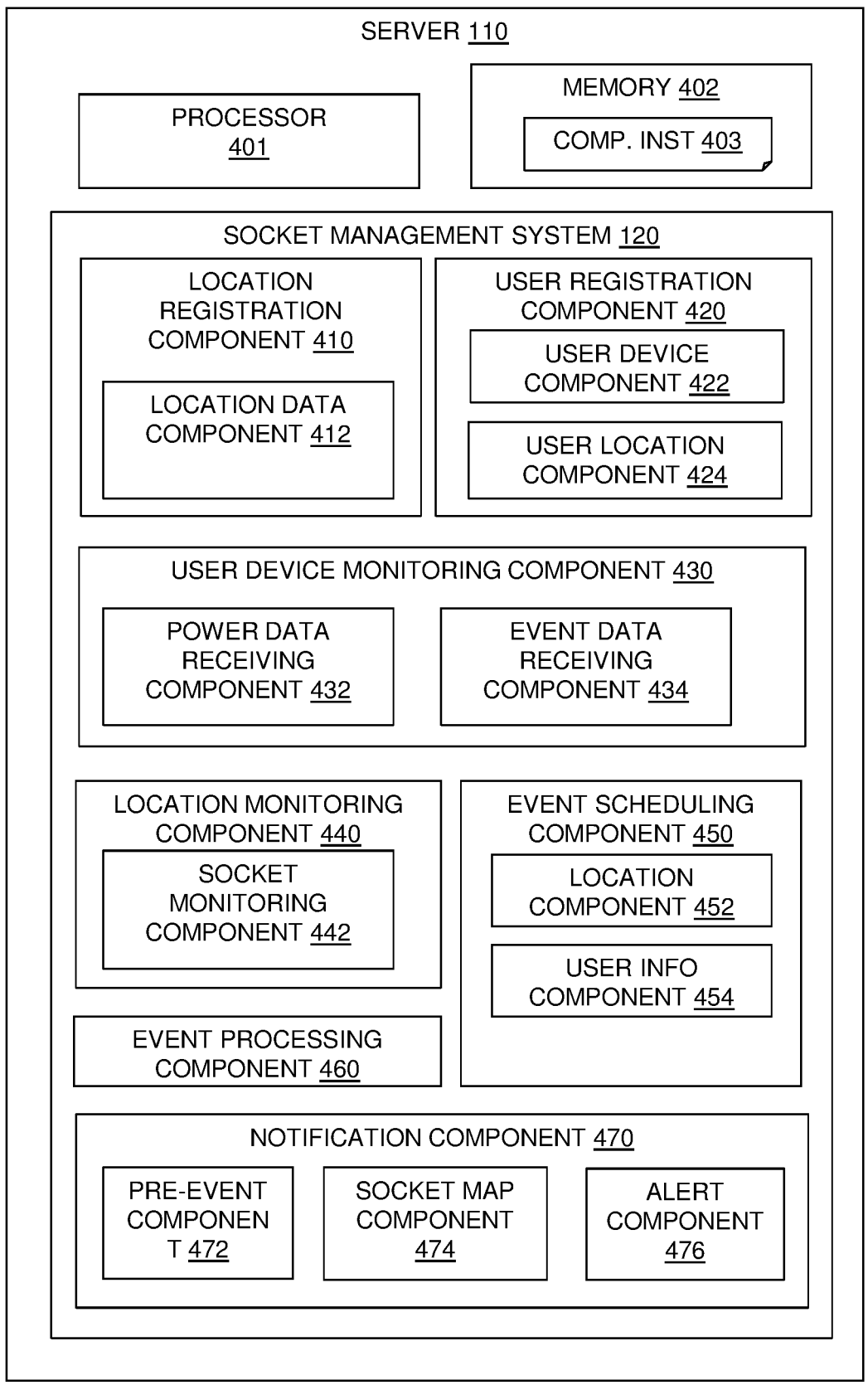
FIG. 4 is block diagram of an example embodiment of an aspect of a system in accordance with the present invention.

Referring to FIG. 4, a block diagram show a server 110 computing system with a socket management system 120.

The server 110 may include at least one processor 401, a hardware module, or a circuit for executing the functions of the described components which may be software units executing on the at least one processor. Multiple processors running parallel processing threads may be provided enabling parallel processing of some or all of the functions of the components. Memory 402 may be configured to provide computer instructions 403 to the at least one processor 401 to carry out the functionality of the components.

The socket management system 120 may include a user registration component 420 for receiving registrations of users, including a user device component 422 enabling the user to register several devices. The user registration component 420 may include a user location component 424 enabling the user to specify locations at which they may attend events.

The socket management system 120 may include a location registration component 410 which may include a location data component 412 to record static data relating to an event location, which may be updated prior to a scheduled event.

The socket management system 120 may include a user device monitoring component 430 for receiving data from a plurality of user devices 130-133. The user device monitoring component 430 may receive data from a plurality of user devices 130-133 wirelessly, via a network, and/or via smart sockets when the user devices 130-133 are plugged in.

The user device monitoring component 430 may include a power data receiving component 432 for receiving power data from the plurality of user devices 130-133. The power data may be received via a network connection to the user device 130-133 or via smart sockets 150-152 to which user devices are connected. The user device monitoring component 430 may include an event data receiving component 434 for monitoring event data as obtained from scheduling applications on user devices 130-133 or by entry of event information by a user on a user device 130-133. The user device monitoring component 430 may also receive other forms of data or information, such as device location data.

The socket management system 120 may include a location monitoring component 440 for monitoring dynamic data from an event location including a socket monitoring component 442 for receiving data relating to the sockets 150-152 in the event location, for example, via smart sockets 150-152 at the location.

The socket management system 120 may include an event scheduling component 450 for obtaining event information, including a location component 452 for obtaining an event location data and a user information component 454 for obtaining details of the user devices 130-133 required for the event as well as other information such as, required attendees, presenters, required equipment, and duration.

The socket management system 120 may include an event processing component 460 for processing the power data for the required user devices 130-133 for an event by optimizing the use of power sockets at the event location. The event processing component 460 may optimize by using a priority rating of user devices 130-133 based on a user's role and power data of the user's device 130-133.

The socket management system 120 may include a notification component 470 for notifying the required user devices 130-133 of the optimized socket 150-152 usage for a user device 130-133. The notification component 470 may include a pre-event component 472 for notifying users prior to an event of recommended socket 150-1522 utilization that may include an indication of the location of a socket 150-152 for charging during the event, a change of event location or an instruction to charge prior to an event. The notification component 470 may include a socket map component 474 providing a visual representation on a user device 130-133 of the event location 140 showing socket allocation. The notification component 470 may include an alert component 476 for providing alerts to a user device 130-133 providing urgent notifications such as a change of event location 140, an alert to charge a user device 130-133 before the event, or an instruction to change over use of a socket between users' devices during an event.

Figure 5:
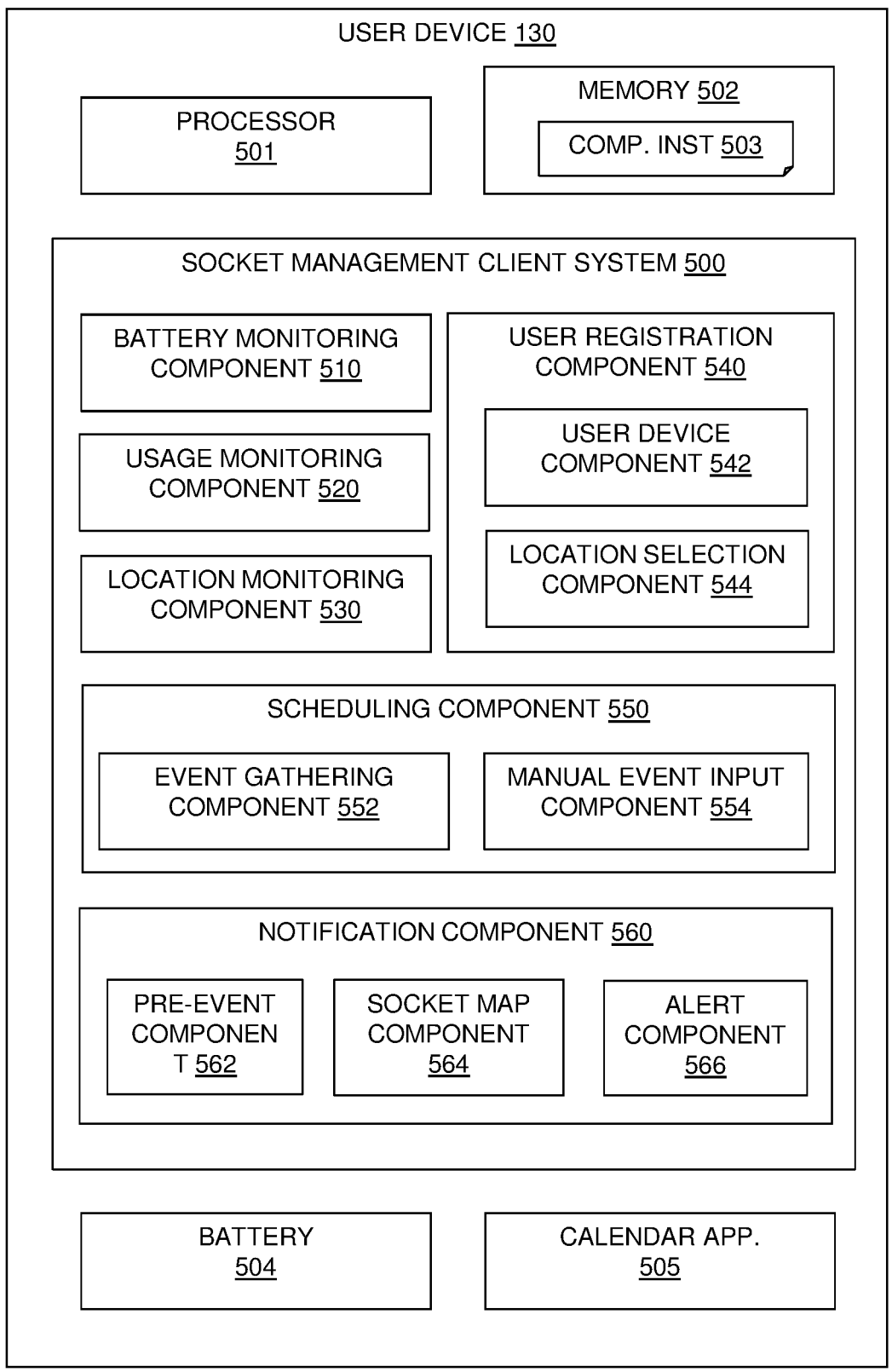
FIG. 5 is block diagram of an example embodiment of an aspect of a system in accordance with the present invention.

Referring to FIG. 5, a block diagram show user device 130 with a socket management client system 500, for example, in the form of a client application that communicates with the socket management system 120 of the server 110.

The user device 130 may be any form of personal computing device and may include at least one processor 501, a hardware module, or a circuit for executing the functions of the described components which may be software units executing on the at least one processor. Memory 502 may be configured to provide computer instructions 503 to the at least one processor 501 to carry out the functionality of the components.

The user device 130 may include a battery 504, which is rechargeable from a power socket. The user device 130 may also include a calendar application 505 which may record scheduled events.

The socket management client system 500 may include a battery monitoring component 510 for monitoring the status of the battery 504 of the user device and a usage monitoring component 520 for monitoring other power data, such as the number of applications running on the user device 130 and the current rate of battery utilization. The socket management client system 500 may also include a location monitoring component 530 for monitoring a current location of the user device 130. The socket management client system 500 may communicate the monitored data to the socket management system 120 of the server 110.

The socket management client system 500 may include a user registration component 540 including a user device component 542 for registering multiple user devices that may be connected via the registration such that a scheduled event for any one of the devices is applied to the other devices of the user. The user registration component 540 may include a location selection component 544 for registering of selected known event locations used by the user.

The socket management client system 500 may include a scheduling component 550 including an event gathering component 552 for gathering scheduling data from the calendar application 505 and a manual event input component 554 for receiving a manual event input by a user.

The socket management client system 500 may include a notification component 560 for receiving notifications from the socket management system 120 of the server 110.

The notification component 560 may include a pre-event component 562 for receiving notification prior to an event of recommended socket utilization, which may include an indication of the location of a socket for charging during the event, a change of event location or an instruction to charge prior to an event. The notification component 560 may include a socket map component 564 for receiving a visual representation on a user device of the event location showing socket allocation. The notification component 560 may include an alert component 566 for receiving alerts providing urgent notifications such as a change of event location, an alert to charge a user device before the event, or an instruction to change over use of a socket between users' devices during an event.

The use of the system is illustrated using some example use scenarios.

Example 1

A user enters an office that he is visiting and logs onto the socket management system. The event, in this case, is the time spent in the office. The battery life of the device and location of the user are detected. Recommendations for the best location of a socket are received. This is based on priorities of use of sockets in the location. For example, a shared printer for an office should never be unplugged so this is the highest priority. Work phones are again a higher priority but can be lowered if a user is working "offline" at the time and not taking calls or solely using their mobile. Each user device connected to the system is recommended sockets that are available without crisscrossing or impeding another user's working area.

Example 2

Based on a calendar invite, expected participants to a meeting whose devices are connected may have their battery life assessed. In addition, any requirement to use other apparatus in the room such as a need to use a monitor or conference phone is assessed. The system uses this information to allocate people needing sockets closer to outlets than those with a sufficiently full battery to last or the meeting's duration. A buffer threshold may be used for a minimum end battery life so that the user is not left urgently needing to recharge after the meeting.

Example 3

User 2 walks into a hot desk office that is almost completely full. User 2 is running out of battery at around 35% and needs a socket. The system tells User 2 to go and sit next to User 1. At this point both of their battery lives and device locations are being monitored. User 1 has 95% battery and the system sends both users a prompt recommending that User 2 should access the socket. If the users ignore this prompt, they may be prompted again at 12% battery life of User 2 as a "critical" warning.

User 3 is sitting three desks down from User 1 but did not receive prompts regarding User 2 needing a socket. User 3 is "on call" so requires two sockets all day for support purposes, which is why User 2 was not recommended to sit next to Use 3.

Example 4

User 1, User 2 and User 3 are seated in a small room working on a project together. There are four sockets in the room but only two sockets are available, as one is connected to a printer/scanner and the other is connected to a phone for a conference call. User 1 and User 2 each have 40% battery left and User 3 has 12%. User 3 is given first priority as the lowest battery life; User 2 is then given next priority as User 2 has a meeting in 30 minutes. The system knows that most of the attendees for the next meeting are currently in a larger meeting and are all running out of power with no access to plugs. They will all need to plug in at the next meeting that includes User 2, so by allowing User 2 to charge now, there will be more availability in the next meeting for User 2's meeting colleagues. User 1 is then permitted to unplug the printer/scanner. When something is sent to the printer, User 1 is alerted to plug the printer/scanner back in.

Figure 6:
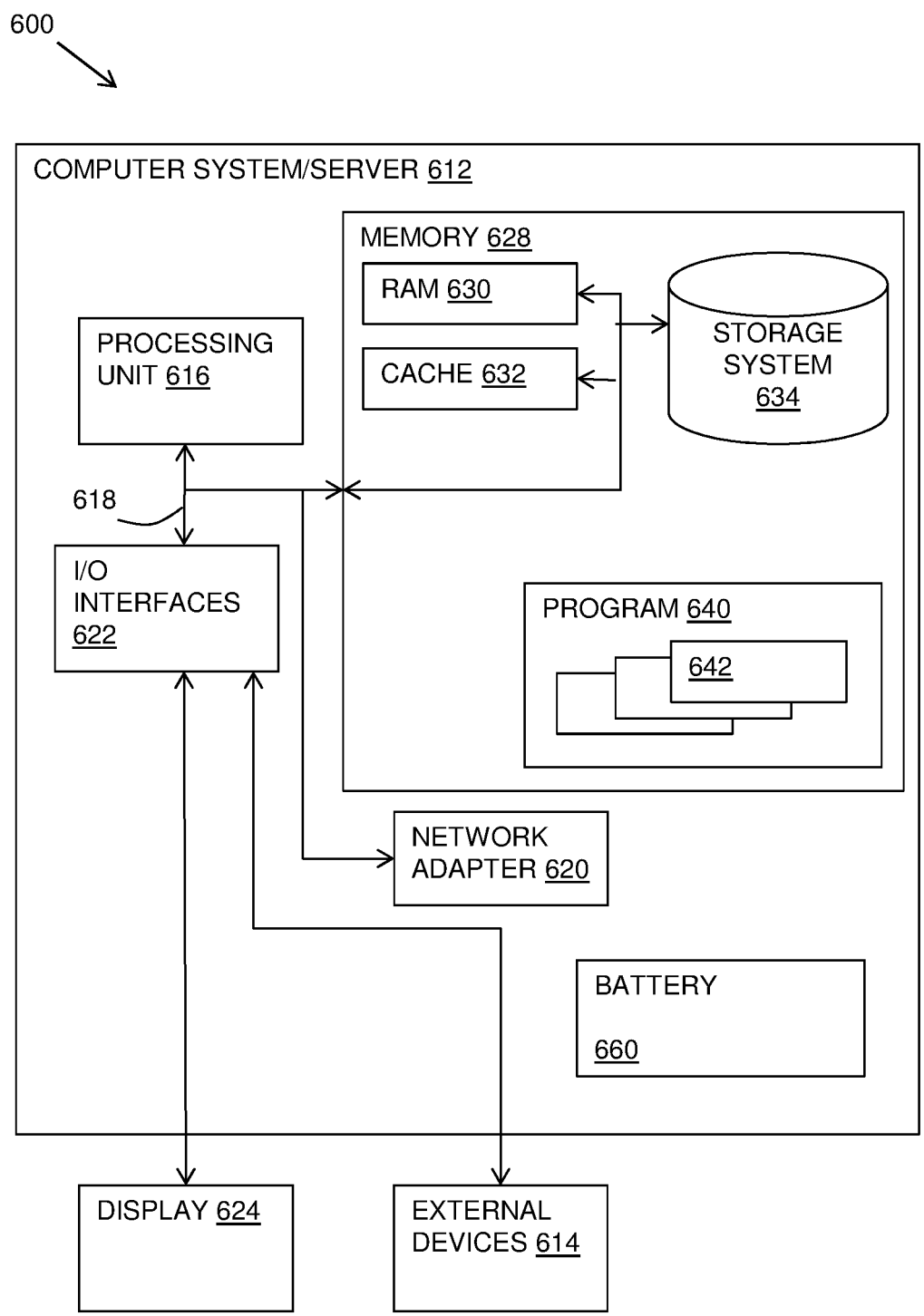
FIG. 6 is a block diagram of an embodiment of a computer system or cloud server in which the present invention may be implemented.

Referring now to FIG. 6, a schematic of an example of a system 600 in the form of a computer system or server is shown.

A computer system or server 612 may be operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

In FIG. 6, a computer system/server 612 is shown in the form of a general-purpose computing device. The components of the computer system/server 612 may include, but are not limited to, one or more processors or processing units 616, a system memory 628, a battery 660, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
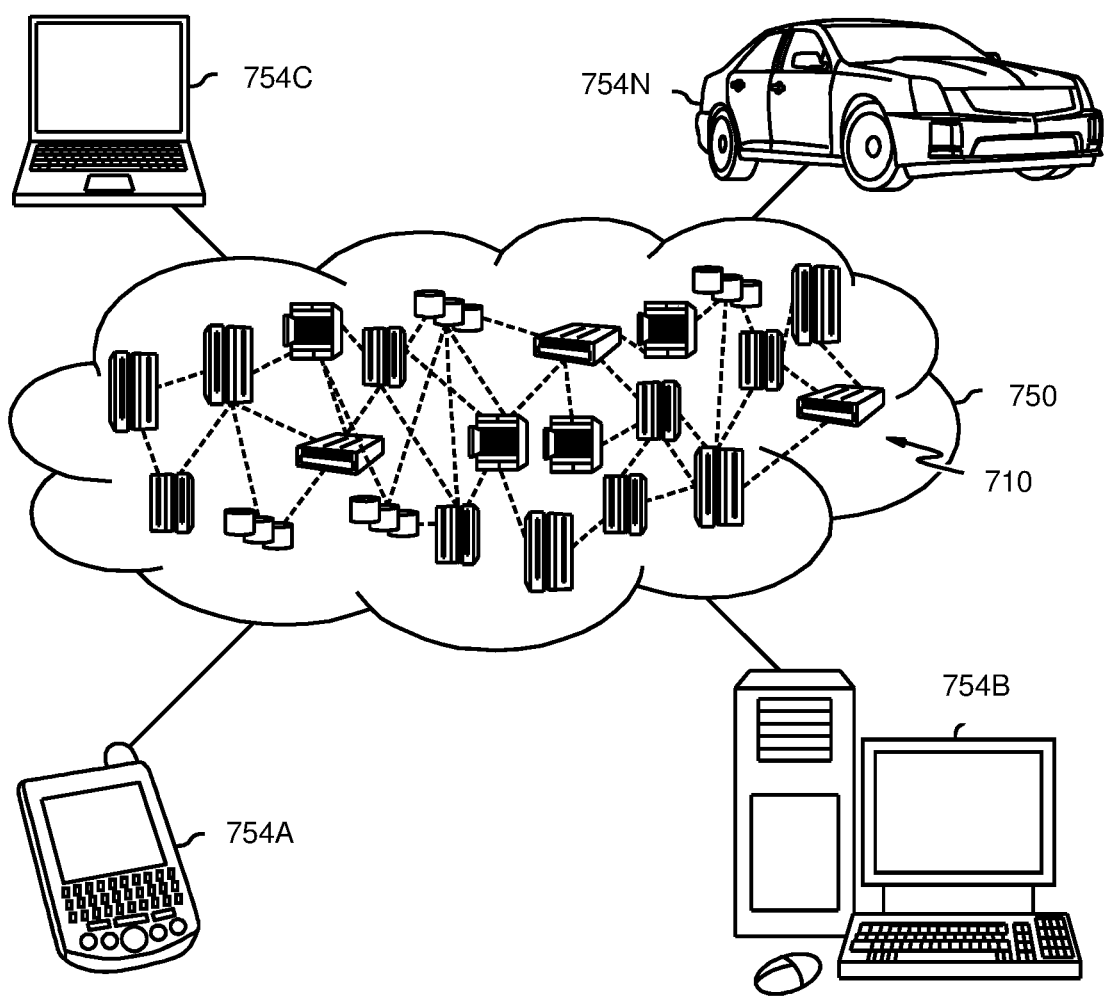
FIG. 7 is a schematic diagram of a cloud computing environment in which the present invention may be implemented.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
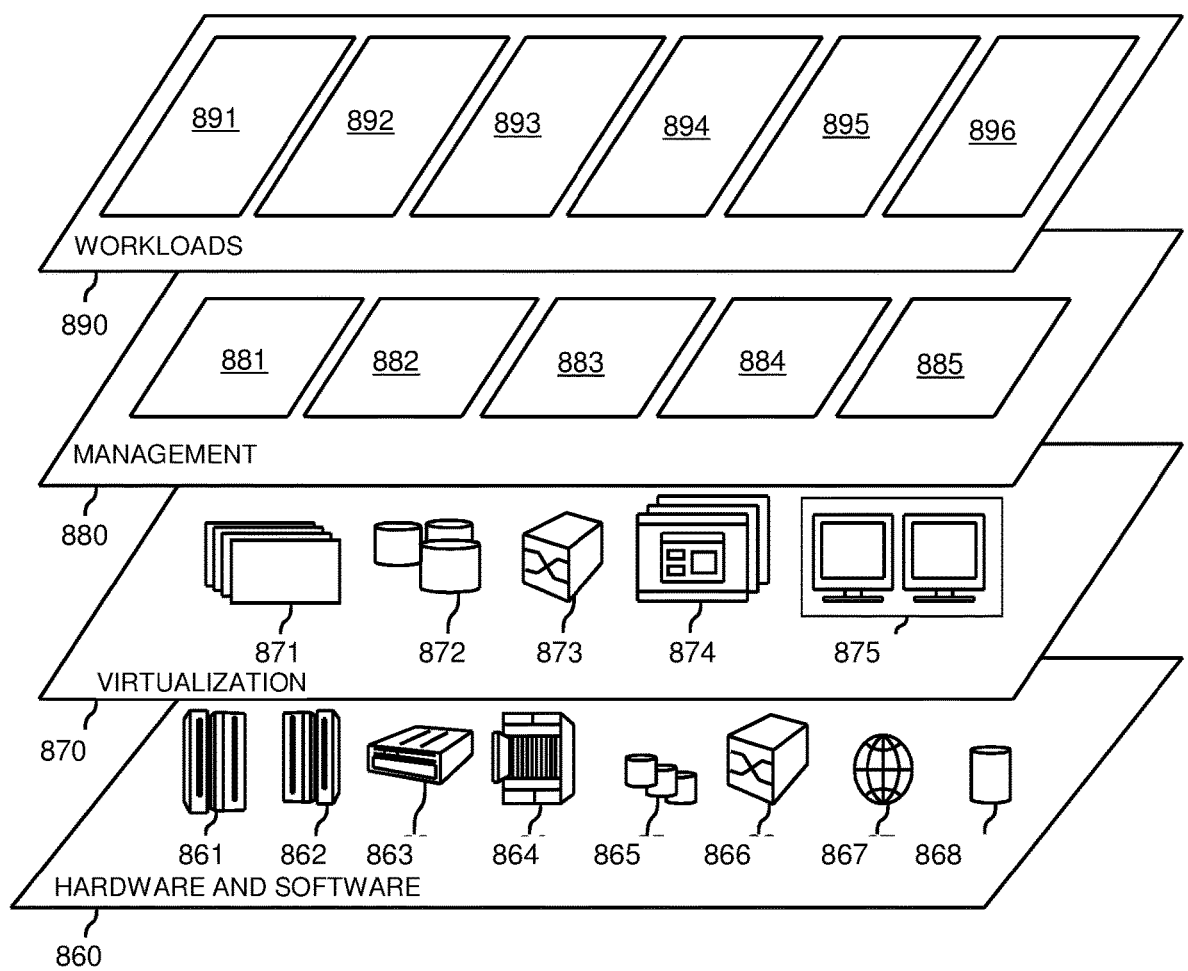
FIG. 8 is a diagram of abstraction model layers of a cloud computing environment in which the present invention may be implemented.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and socket management processing 896.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A computer-implemented method for power socket management carried out at a server, comprising:
   receiving an event location registration;
   receiving a user registration for each of a plurality of user devices to use a system for power socket management, wherein the plurality of user devices include a battery;
   receiving a plurality of power data from the plurality of user devices;
   obtaining event information for an event location, including details of the plurality of user devices required for an event;
   determining whether an apparatus, located at the event location, is required for a duration of the event;
   in response to determining that the apparatus at the event location is required, monitoring a plurality of power sockets at the event location to determine whether the plurality of power sockets have the apparatus plugged in;
   processing the plurality of power data for the plurality of user devices for the event by optimizing use of the plurality of power sockets at the event location; and
   notifying each of the required user devices of the optimized socket usage for the event, wherein the notifying includes notifying users prior to the event of recommended socket utilization, the notification including a recommendation to change the event location if too many devices that are registered for the event require charging.

2. The method as claimed in claim 1, wherein receiving power data includes receiving for a user device of the plurality of user devices one or more datum of the group consisting of: a current battery reserve, a required utilization, and an expected power drain.

3. The method as claimed in claim 1, wherein obtaining event information includes obtaining event information from a user device's scheduling application or receiving event information input by a user, and includes: required attendees, presenters, required equipment, and duration.

4. The method as claimed in claim 1, wherein the obtaining of event information further comprises obtaining available socket information for the event location, and wherein the processing the plurality of power data further comprises optimizing by using a priority rating of user devices based on a user's role and power data of the user's device.

5. The method as claimed in claim 1, wherein the notifying includes notifying the users prior to the event of recommended socket utilization, the notification including one or more messages of the group consisting of: a map of the event location showing socket allocation and an alert to charge a user device of the plurality of user devices before the event.

6. The method as claimed in claim 1, wherein the notifying of each of the required user devices of the optimized socket usage includes notifying first and second users during an event, wherein the notification includes a recommendation to change over use of a particular socket from use by the first user to use by the second user.

7. The method as claimed in claim 1, wherein the plurality of power sockets are smart power sockets, each smart power socket capable of transferring power data from one of the plurality of user devices plugged into the smart power socket to the server.

8. The method as claimed in claim 1, wherein the plurality of power sockets are smart power sockets, further comprising disabling a smart socket of the plurality of power sockets at an event location unless a user device of the plurality of user devices plugged into the socket of the plurality of power sockets is operating a power socket management application.

9. The method as claimed in claim 8, including an authentication of a user device of the plurality of user devices at the smart socket of the plurality of power sockets by exchange of secure keys.

10. A system for power socket management, comprising:
a computer system comprising, a processor, a computer readable storage medium, and program instructions stored on the computer readable storage medium being executable by the processor to cause the computer system to:
receive an event location registration;
receive a user registration for each of a plurality of user devices to use a system for power socket management, wherein the plurality of user devices include a battery;
receive a plurality of power data from the plurality of user devices;
obtain event information for an event location, including details of the plurality of user devices required for an event;
determine whether an apparatus, located at the event location, is required for a duration of the event;
in response to determining that the apparatus at the event location is required, monitor a plurality of power sockets at the event location to determine whether the plurality of power sockets have an apparatus plugged in;
process the plurality of power data for the required user devices for the event by optimizing use of power sockets at the event location; and
notify each of the required user devices of the plurality of user devices of the optimized socket usage for the event, wherein the notifying includes notifying users prior to the event of recommended socket utilization, the notification including a recommendation to change the event location if too many devices that are registered for the event require charging.

11. The system as claimed in claim 10, wherein receiving power data includes receiving for a user device of the plurality of user devices one or more datum of the group consisting of: a current battery reserve, a required utilization, and an expected power drain.

12. The system as claimed in claim 10, wherein obtaining event information includes obtaining event information from a user device's scheduling application or receives event information input by a user, and includes: required attendees, presenters, required equipment, and duration.

13. The system as claimed in claim 10, wherein the obtaining of event information further comprises obtaining available socket information for the event location, and wherein the processing the plurality of power data further comprises optimizing by using a priority rating of user devices based on a user's role and power data of the user's device of the plurality of user devices.

14. The system as claimed in claim 10, wherein the notifying includes notifying the users prior to the event of recommended socket utilization, the notification including one or more messages of the group consisting of: a map of the event location showing socket allocation and an alert to charge a user device of the plurality of user devices before the event.

15. The system as claimed in claim 10, wherein the notifying of each of the required user devices of the optimized socket usage includes notifying first and second users during an event, wherein the notification includes a recommendation to change over use of a particular socket from use by the first user to use by the second user.

16. The system as claimed in claim 10, wherein the plurality of power sockets are smart power sockets, each smart power socket capable of transferring power data from one of the plurality of user devices plugged into the smart power socket to the server.

17. The system as claimed in claim 10, wherein the system is connected to the smart power sockets of the plurality of power sockets, each smart power socket adapted to only allow user devices that are registered on the system to access the power.

18. The system as claimed in claim 10, including program instructions to monitor available battery power of the user device of the plurality of user devices.

19. A computer program product for power socket management, the computer program product comprising a computer readable storage medium having program instructions embodied therewith, the program instructions executable by a processor to cause the processor to:
receive an event location registration;
receive a user registration for each of a plurality of user devices;
receive power data from a plurality of user devices;
obtain event information for an event location, including details of the plurality of user devices required for an event;
determine whether an apparatus, located at the event location, is required for a duration of the event;
in response to determining that the apparatus at the event location is required, monitor a plurality of power sockets at the event location to determine whether the plurality of power sockets have the apparatus plugged in;
process the power data for the required user devices for the event by optimizing use of the plurality of power sockets at the event location wherein the plurality of power sockets are smart power sockets; and
notify each of the required user devices of the optimized socket usage for the event, wherein the notifying includes notifying users prior to the event of recommended socket utilization, the notification including a recommendation to change the event location if too many devices that are registered for the event require charging.

20. The method of claim 1, wherein the apparatus is a printer, a scanner, a projector, a monitor, or a conference telephone.

* * * * *